United States Patent
Kawahara et al.

(10) Patent No.: US 6,970,213 B2
(45) Date of Patent: Nov. 29, 2005

(54) OPTICAL FILM AND LIQUID-CRYSTAL DISPLAY DEVICE USING THE OPTICAL FILM

(75) Inventors: Satoru Kawahara, Ibaraki (JP); Naoki Takahashi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 10/350,131

(22) Filed: Jan. 24, 2003

(65) Prior Publication Data

US 2003/0142250 A1 Jul. 31, 2003

(30) Foreign Application Priority Data

Jan. 25, 2002 (JP) .................................. P2002-016372

(51) Int. Cl.⁷ .......................................... G02F 1/1335
(52) U.S. Cl. ..................... 349/96; 349/115; 349/122; 349/112; 359/487
(58) Field of Search ................... 349/96, 112, 115, 349/185, 122, 95; 359/486–487, 497, 500

(56) References Cited

U.S. PATENT DOCUMENTS

| 4,293,435 A |   | 10/1981 | Portugall et al. |         |
|-------------|---|---------|------------------|---------|
| 5,332,522 A |   |  7/1994 | Chen et al.      |         |
| 5,999,243 A | * | 12/1999 | Kameyama et al.  | 349/185 |
| 6,124,905 A | * |  9/2000 | Iijima           | 349/62  |
| 6,166,790 A | * | 12/2000 | Kameyama et al.  | 349/96  |
| 6,166,799 A | * | 12/2000 | Kameyama et al.  | 349/185 |

FOREIGN PATENT DOCUMENTS

JP           55-21479           2/1980

* cited by examiner

Primary Examiner—Toan Ton
(74) Attorney, Agent, or Firm—Sughrue Mion, PLLC

(57) ABSTRACT

An optical film constituted by a laminate of a polarizer and a reflective polarizing film through an acrylic-based pressure-sensitive adhesive agent, the polarizer having an anti-glare layer, wherein the optical film has a haze (H) in a range of from 5% to 30%. Preferably, a haze (H1) of the polarizer and a haze (H2) of the reflective polarizing film satisfy the relation H1>H2. Preferably, the haze (H) of the optical film satisfies the relation H/H1>0.5.

15 Claims, 1 Drawing Sheet

OPTICAL FILM AND LIQUID-CRYSTAL DISPLAY DEVICE USING THE OPTICAL FILM

The present application is based on Japanese Patent Application No. 2002-016372, which is incorporated herein by reference.

BACKGROUND OF THE INVENTION

1. Field of the Invention

The present invention relates to an optical film used in a liquid-crystal display device (LCD) or the like. More specifically, it relates to an optical film adapted for improvement in display characteristic and luminance, and a liquid-crystal display device using the optical film.

2. Description of the Related Art

An LCD is used in a personal computer or the like. There has been a rapidly increasing demand for the LCD in recent years. Measures to make all constituent members of the LCD thin to thereby make the LCD thin as a whole have been examined. One of the constituent members which has been improved most remarkably in terms of reduction in thickness is a backlight unit. The backlight unit used in a liquid-crystal panel is constituted by a laminate of various films such as a laminate of a light pipe, a diffusing plate and a condensing sheet. Accordingly, interference or sticking caused by lamination of films looks like a defect when an image is displayed. Particularly the necessity for making the constituent members of the backlight unit (such as a light pipe, a diffusing plate and a condensing sheet) thin, reducing clearances between the members or removing some of the members for the sake of simplification has occurred with the strong requirement of reduction in thickness of the liquid-crystal panel in recent years. Hence, there a rises a problem that a defect or a sticking portion due to interference fringes (Newton's rings) or sticking caused by lamination of films is made visible when an image is displayed. On the other hand, both reduction in thickness of the backlight unit and improvement in definition of display lead to reduction in luminance of the panel, that is, go against the recent tendency to increase in luminance of the LCD panel. Therefore, a luminance enhancement film becomes essential to supply required panel luminance.

Although measures to insert a diffusing plate between the backlight unit and the liquid-crystal panel or to provide a diffusing layer in the luminance enhancement film or the polarizer itself have been heretofore taken to make the aforementioned defect invisible on the display, the measurements could not satisfy the requirement of reduction in thickness, retention of necessary characteristic and reduction in cost.

SUMMARY OF THE INVENTION

In order to solve the problems in the related art, an object of the invention is to provide an optical film in which both display quality and luminance enhancement can be achieved simultaneously, and a thin liquid-crystal display device using the optical film.

The invention is based on the knowledge that when a polarizer having an anti-glare (AG) layer constituted by a silica-based filler, a UV-setting resin, etc. is integrally laminated on a reflective polarizing film (luminance enhancement film) to form an optical film having a slight haze, both display quality and luminance enhancement can be achieved simultaneously because reduction in luminance caused by the haze of the optical film can be minimized while the problem of production of Newton's rings caused by the backlight unit side can be relaxed on display.

That is, the invention provides an optical film having a laminate of a polarizer and a reflective polarizing film, the polarizer having an anti-glare layer, wherein the optical film has a haze (H) in a range of from 5% to 30%. If the haze is lower than 5%, the effect of relaxing interference fringes or the like is reduced. If the haze is higher than 30%, the function of improving luminance is reduced greatly. Preferably, the haze is selected to be in a range of from 10% to 25%.

Incidentally, the term "haze" means the degree of turbidity of a film or the like measured in numerical terms and expressed in the formula: (diffuse transmittance/total light ray transmittance)×100 under JIS K-7105.

Preferably, in the optical film, a haze (H1) of the polarizer and a haze (H2) of the reflective polarizing film satisfy the relation H1>H2. Preferably, the polarizer and the reflective polarizing film are laminated through a pressure-sensitive adhesive agent (preferably, an acrylic-based pressure-sensitive adhesive agent). Preferably, a haze (H1) of the polarizer and the haze (H) of the optical film satisfy the relation H/H1>0.5.

In the optical film, the anti-glare layer formed in the polarizer has a thickness (d) preferably in a range of from 3 $\mu$m to 20 $\mu$m, both inclusively, more preferably in a range of from 5 $\mu$m to 15 $\mu$m, both inclusively. If the thickness of the anti-glare layer is smaller than 3 $\mu$m, it is difficult to obtain a required haze value. If the thickness of the anti-glare layer is larger than 20 $\mu$m, the thickness of the optical film increases as well as the haze value increases.

In the optical film, the anti-glare layer formed in the polarizer has a surface roughness preferably in a range of from 40 $\mu$m to 120 $\mu$m, both inclusively, more preferably in a range of from 50 $\mu$m to 90 $\mu$m, both inclusively, in terms of an average peak-trough interval (Sm). If the surface roughness Sm of the anti-glare layer formed in the polarizer is smaller than 40 $\mu$m, there is fear that fine air bubbles may be contained in the optical film at the time of sticking as well as the haze value increases. On the other hand, if the surface roughness Sm of the anti-glare layer is larger than 120 $\mu$m, a required haze value is hardly obtained so that the effect intended by the invention cannot be obtained.

Preferably, in the optical film, the reflective polarizing film is constituted by a combination of a cholesteric liquid crystal layer and a quarter-wave plate.

Preferably, in the optical film, the reflective polarizing film has a linearly polarized light separating function using reflection in multilayer interfaces.

The invention further provides a liquid-crystal display device having a liquid crystal cell, and at least one optical film defined above and stuck to at least one surface of the liquid crystal cell through a pressure-sensitive adhesive layer.

DETAILED DESCRIPTION OF THE PREFERRED EMBODIMENTS

Figure 1:
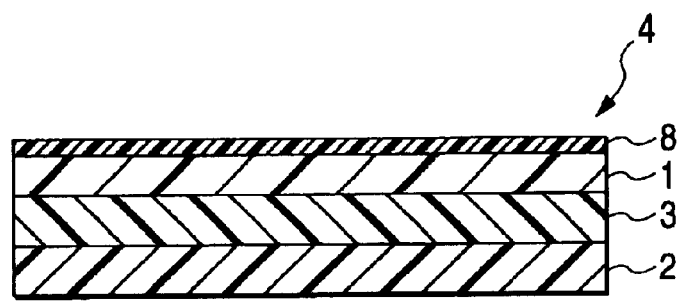
FIG. 1 is a sectional view showing an example of an optical film according to the invention.
Figure 2:
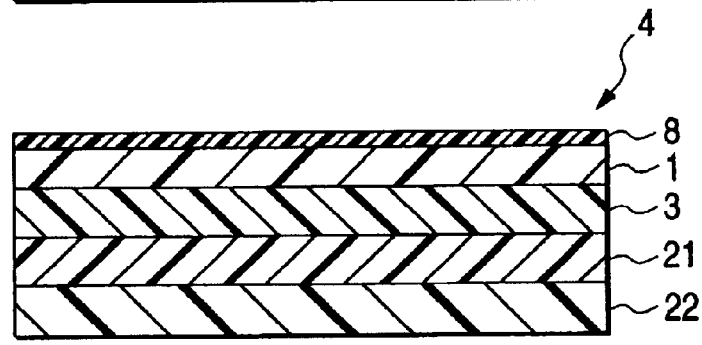
FIG. 2 is a sectional view showing another example of the optical film according to the invention.

An optical film according to the invention is constituted by a laminate of a polarizer and a reflective polarizing element (luminance enhancement film). FIGS. 1 and 2 show examples of the optical film 4. In FIGS. 1 and 2, the reference numeral 1 designates a polarizer; 2, a reflective polarizing film; and 3, a pressure-sensitive adhesive layer. When the reflective polarizing film 2 is constituted by a combination of a quarter-wave plate 21 (also referred to as "λ/4 plate") and a cholesteric liquid crystal layer 22 as shown in FIG. 2, the polarizer 1 is provided on the quarter-wave plate 21 side so that the cholesteric liquid crystal layer 22 is formed on the outside of the quarter-wave plate 21.

The thickness of the quarter-wave plate 21 is generally in a range of from about 5 μm to about 150 μm whereas the thickness of the reflective polarizing film 2 is generally in a range of from about 30 μm to about 300 μm. The thickness of the pressure-sensitive adhesive layer is generally in a range of from about 10 μm to about 35 μm.

The basic configuration of the polarizer used in the invention is as follows. A synthetic resin film is dyed, crosslinked, stretched and dried to form a polarizing element of a polyvinyl alcohol-based polarizing film containing a dichroic substance. A transparent protective film which serves as a protective layer is bonded to one or each surface of the polarizing element through a suitable adhesive layer such as an adhesive layer of a vinyl alcohol-based polymer to thereby form the polarizer.

As the polarizing element (polarizing film), there can be used a suitable optical element which can transmit linearly polarized light when natural light is made incident onto the optical element and which is formed in such a manner that suitable processes such as a dyeing process using a dichroic substance such as iodine or dichroic dye, a stretching process, a crosslinking process, etc. are applied to a suitable film of a vinyl alcohol-based polymer, such as a polyvinyl alcohol or partially formalized polyvinyl alcohol, in a suitable sequence or system. Particularly, an element excellent in light transmittance and the degree of polarization is preferably used as the polarizing element. The thickness of the polarizing element is not particularly limited. The thickness is generally in a range of from 1 μm to 80 μm, preferably in a range of from 2 μm to 40 μm.

A suitable transparent film can be used as the material of the protective film which serves as the transparent protective layer provided on one or each surface of the polarizing element (polarizing film). Particularly, a film of a polymer excellent in transparency, mechanical strength, heat stability, moisture sealability, etc. is preferably used as the protective film. Examples of the polymer include: an acetate-based resin such as triacetyl cellulose; a polyester-based resin; a polynorbornene-based resin; a polyether-sulfone-based resin; a polycarbonate-based resin; a polyamide-based resin; a polyimide-based resin; a polyolefin-based resin; an acrylic-based resin; and a thermosetting or ultraviolet-setting resin such as an acrylic-based resin, an urethane-based resin, an epoxy-based resin or a silicone-based resin. Particularly, an acetate-based resin is preferably used from the point of view of transparency. More particularly, a triacetyl cellulose film having a surface saponified with alkali or the like is preferably used from the point of view of polarizing characteristic, durability, etc. The thickness of the transparent protective film is optional but generally selected to be not larger than 500 μm, preferably in a range of from 5 μm to 300 μm for the purpose of reduction in thickness of the polarizer. Incidentally, when transparent protective films are provided on opposite surfaces of the polarizing film, the transparent protective films may be made of polymers different between the opposite surfaces on the front and rear sides.

In the invention, an anti-glare treatment is applied to the transparent protective film used as the protective layer. The anti-glare treatment is heretofore provided for preventing visibility of light transmitted through the polarizer from being disturbed by external light reflected from the surface of the polarizer. For example, the anti-glare layer can be formed in such a manner that a fine roughness structure is given to a surface of the transparent protective film by a suitable method such as a surface-roughening method using sandblasting, embossing, etc. or a method of mixing transparent fine particles. The transparent protective film used as the protective layer maybe subjected to a hard coating treatment, an anti-reflection treatment, an anti-sticking treatment, etc. if the purposes of the invention are not spoiled.

For example, the transparent fine particles have a mean particle size of from 0.5 μm to 20 μm. Examples of the material of the transparent fine particles include silica, alumina, titania, zirconia, tin oxide, indium oxide, cadmium oxide, and antimony oxide. Inorganic fine particles having electric conducting characteristic may be used as the transparent fine particles or organic fine particles constituted by crosslinked or non-crosslinked polymer grained substances may be used as the transparent fine particles. Generally, the amount of the transparent fine particles used is in a range of from 2 parts by mass to 70 parts by mass, particularly in a range of from 5 parts by mass to 50 parts by mass with respect to 100 parts by mass of the transparent resin.

The reference numeral 8 in FIGS. 1 and 2 is an anti-glare layer formed on the polarizer 1. The anti-glare layer containing the transparent fine particles may be the transparent protective layer itself or may be provided as a layer applied onto a surface of the transparent protective layer. The anti-glare layer may serve also as a diffusing layer (having a viewing angle compensating function, etc.) for enlarging the viewing angle by diffusing light transmitted through the polarizer. Incidentally, the anti-glare layer or the like may be provided separately from the transparent protective layer, that is, in the form of an optical layer made of a sheet containing the anti-glare layer or the like.

The process of bonding the polarizing element (polarizing film) and the transparent protective film as a protective layer to each other is not particularly limited. For example, the bonding process can be performed through an adhesive agent made of a vinyl alcohol-based polymer or an adhesive agent at least made of a water-soluble crosslinker of a vinyl alcohol-based polymer containing boric acid, borax, glutaraldehyde, malamine, oxalic acid or the like. The adhesive layer can be formed as a layer of an aqueous solution applied and dried. When the aqueous solution is prepared, other additives and a catalyst such as acid may be mixed with the aqueous solution as occasion demands.

A suitable film can be used as the reflective polarizing film (luminance enhancement film) used in the invention. Examples of the reflective polarizing film include: a film (e.g., "D-BET" made by 3M Company) exhibiting characteristic of transmitting a linearly polarized light component having a predetermined axis of polarization but reflecting other light components, such as a multilayer dielectric thin film or a multilayer laminate of thin films different in refractive index anisotropy; and a film exhibiting characteristic of reflecting either of right-hand and left-hand circularly polarized light components but transmitting other light components, such as a film (e.g., "PCF350" made by Nitto Denko Corp. or "Transmax" made by Merck & Co., Inc.) having a cholesteric liquid crystal layer, particularly an oriented film or oriented liquid crystal layer of a cholestric liquid crystal polymer supported on a film base.

Accordingly, in the luminance enhancement film of the type of transmitting a linearly polarized light component having a predetermined axis of polarization, when light transmitted through the luminance enhancement film is made incident onto the polarizer directly while the axis of polarization is keep constant, the light can be efficiently transmitted through the polarizer while absorption loss due to the polarizer is suppressed. On the other hand, in the luminance enhancement film of the type of transmitting circularly polarized light such as a film having a cholesteric liquid crystal layer, the circularly polarized light transmitted through the luminance enhancement film can be made incident onto the polarizing element directly but it is preferable from the point of view of suppressing absorption loss that the circularly polarized light transmitted is converted into linearly polarized light by a phase retarder so that the linearly polarized light is made incident onto the polarizer. Incidentally, a quarter-wave plate can be used as the phase retarder for converting the circularly polarized light into linearly polarized light.

The angle of the polarizer relative to the quarter-wave plate in the case where the polarizer is arranged on the upper side of the quarter-wave plate can be decided suitably in accordance with the retardation characteristic of the quarter-wave plate and the characteristic of circularly polarized light incident onto the quarter-wave plate.

Specific examples of the quarter-wave plate herein used include: a birefringent film obtained by stretching a film of a suitable polymer such as polycarbonate, polyvinyl alcohol, polystyrene, polymethyl methacrylate, polypropylene or any other polyolefin, polyallylate, and polyamide; an oriented film of a liquid crystal polymer; and an oriented layer of a liquid crystal polymer supported by a film.

For example, the phase retarder functioning as a quarter-wave plate in a wide wavelength range of a visible light region or the like can be obtained by a method of superposing a retardation layer functioning as a quarter-wave plate for monochromatic light at a wavelength of 550 nm on a retardation layer exhibiting another retardation characteristic such as a retardation layer functioning as a half-wave plate. Accordingly, the phase retarder disposed between the polarizer and the luminance enhancement film may be constituted by one retardation layer or by two or more retardation layers.

Incidentally, with respect to the cholesteric liquid crystal layer, two or three or more cholesteric liquid crystal layers different in reflection wavelength may be superposed on each other or one another so that circularly polarized light can be reflected in a wide wavelength range of a visible light region or the like. In this case, circularly polarized light transmitted through the cholesteric liquid crystal layers in a wide wavelength range can be obtained.

The cholesteric liquid crystal layer used herein is made of a cholesteric liquid crystal polymer oriented in the Grandjean structure and having a function of separating natural light into left-hand and right-hand circularly polarized light components through reflection and transmission. The cholesteric liquid crystal layer can be formed by use of a suitable cholesteric liquid crystal polymer and can be constituted by one cholesteric liquid crystal polymer layer or by two or more cholesteric liquid crystal polymer layers. The cholesteric liquid crystal polymer is excellent in efficiency in superposition of liquid crystal layers and reduction in film thickness and excellent in reduction in the change of optical characteristic in accordance with the change of the viewing angle so that a liquid-crystal display device having a wide viewing angle can be formed. Particularly in order to enlarge a wavelength range of selective reflection, a cholesteric liquid crystal polymer large in birefringence is preferably used.

Incidentally, an example of the cholesteric liquid crystal polymer is a main chain type or side chain type polymer containing conjugated linear atomic groups (mesogen) introduced into main or side chains of the polymer to give liquid crystal orientation. A cholesteric liquid crystal polymer exhibiting a glass transition temperature of from 30° C. to 150° C. is preferably used from the point of view of handling property and stability of orientation at the practical use temperature. A specific example of the main chain type cholesteric liquid crystal polymer is a polymer, such as a polyester-based polymer, a polyamide-based polymer, a polycarbonate-based polymer or a polyester-imide-based polymer, having a structure in which mesogen groups constituted by a para-substitutional cyclic compound or the like are bonded to one another through flexion-donating spacer portions provided as occasion demands.

Specific examples of the side chain type cholesteric liquid crystal polymer include: a polymer having polyacrylate, polymethacrylate, polysiloxane, polymalonate or the like as a main chain skeleton and having low-molecular liquid crystal compounds (mesogen portions) constituted by para-substitutional cyclic compounds or the like through spacer portions constituted by conjugated atomic groups as side chains provided as occasion demands; a nematic-based liquid crystal polymer containing a low-molecular chiral agent; a liquid crystal polymer containing a chiral component introduced therein; and a nematic-and-cholesteric-based mixture liquid crystal polymer.

Even in the case where a nematic orientation-donating para-substitutional cyclic compound constituted by para-substitutional aromatic units or para-substitutional cyclohexyl ring units such as azomethine form, azo form, azoxy form, ester form, biphenyl form, phenylcyclohexane form or bicyclohexane form is provided as described above, cholesteric orientation can be given by a method of introducing a suitable chiral component, a low-molecular chiral agent or the like made of an asymmetric carbon atom-containing compound (Unexamined Japanese Patent Application No. Sho. 55-21479, U.S. Pat. No. 5,332,522, and so on). Incidentally, terminal substituents in para positions of the para-substitutional cyclic compound may be suitable groups such as cyano groups, alkyl groups or alkoxy groups.

Examples of the spacer portions include polymethylene chain $—(CH_2)_n—$ and polyoxymethylene chain $—(CH_2CH_2O)_m—$ exhibiting flexion. The number of repetitions of a structure unit for forming one spacer portion is decided suitably in accordance with the chemical structure of the mesogen portion. n in the polymethylene chain is generally selected to be in a range of from 0 to 20, preferably in a range of from 2 to 12, and m in the polyoxymethylene chain is generally selected to be in a range of from 0 to 10, preferably in a range of from 1 to 3.

The thickness of the liquid crystal polymer layer, particularly the cholesteric liquid crystal polymer layer, formed on the oriented film is preferably selected to be in a range of from 0.5 μm to 100 μm, more preferably in a range of from 1 μm to 50 μm, further preferably in a range of from 2 μm to 20 μm, in terms of prevention of both disturbance of orientation and lowering of transmittance, selective reflection (wavelength range exhibiting circular dichroism), and so on.

The polarizer having the anti-glare layer and the reflective polarizing film according to the invention are preferably stuck and fixed to each other through a tackifier (pressure-sensitive adhesive agent), that is, integrated with each other in terms of prevention of axial displacement, prevention of interlayer contamination with alien matter, and so on. For example, the pressure-sensitive adhesive agent contains, as a base polymer, a suitable polymer such as an acrylic-based polymer, a silicone-based polymer, polyester, polyurethane, polyether, or synthetic rubber. Particularly, there is preferred a pressure-sensitive adhesive agent such as an acrylic-based pressure-sensitive adhesive agent which is excellent in optical transparency, which exhibits tackiness such as moderate wettability, cohesion, and adhesion which is excellent in weather resistance, heat resistance, etc. and which is free from a problem of separation such as floating or peeling under the heating and moistening condition.

A pressure-sensitive adhesive layer may be provided on the optical film so that the optical film can be bonded to another member such as a liquid crystal cell by the pressure-sensitive adhesive layer. The pressure-sensitive adhesive layer can be made of a suitably pressure-sensitive adhesive agent such as an acrylic-based adhesive agent which can be provided in accordance with the related art. It is particularly preferable that the pressure-sensitive adhesive layer is low in coefficient of moisture absorption and excellent in heat resistance in terms of prevention of both foaming phenomenon and peeling phenomenon caused by moisture absorption, prevention of both lowering of optical characteristic and warping of the liquid crystal cell caused by the thermal expansion difference or the like, formability of a liquid-crystal display device high in quality and excellent in durability, and so on. The pressure-sensitive adhesive layer may contain fine particles so that the pressure-sensitive adhesive layer can exhibit light-diffusing characteristic.

When the pressure-sensitive adhesive layer provided on the optical film is exposed at its surface, the pressure-sensitive adhesive layer may be preferably temporarily covered with a separator for prevention of contamination until the pressure-sensitive adhesive layer is put into practical use. For example, the separator can be formed by a method in which a suitable thin film provided in the same manner as the transparent protective film is coated with a suitable releasant such as a silicone-based releasant, a long chain alkyl-based releasant, a fluorine-based releasant or a molybdenum sulfide releasant in accordance with necessity.

Each of the layers such as optical layers in the polarizing film, the transparent protective film, etc. and pressure-sensitive adhesive layers constituting the optical film may be formed to have ultraviolet absorbing power by a suitable method of treating the layer with an ultraviolet absorber such as a salicylic ester-based compound, a benzophenone-based compound, a benzotriazole-based compound, a cyanoacrylate-based compound or a nickel complex salt-based compound.

Figure 3:
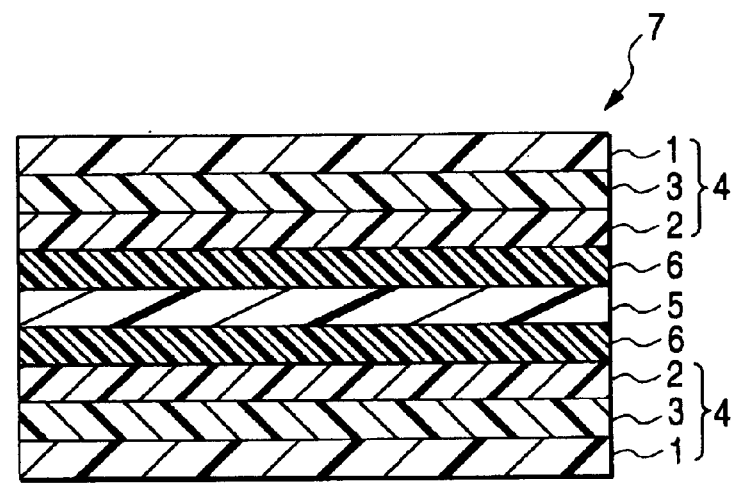
FIG. 3 is a sectional view showing an example of a liquid-crystal display device using the optical film shown in FIG. 1.
Figure 4:
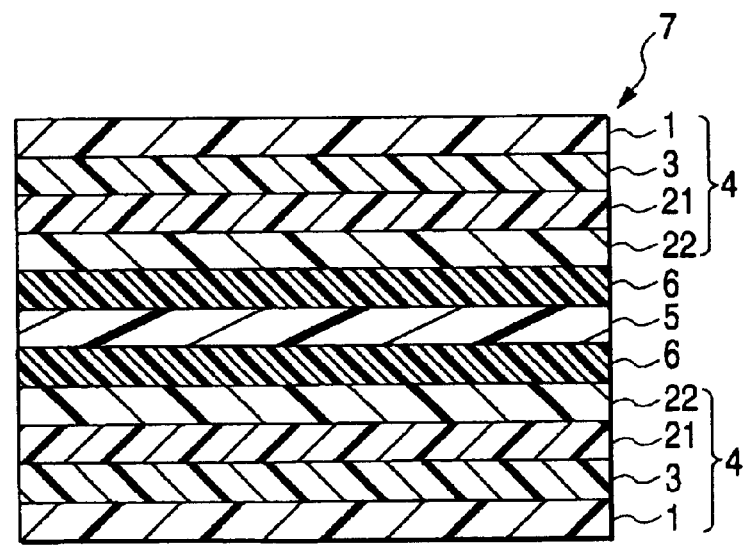
FIG. 4 is a sectional view showing an example of a liquid-crystal display device using the optical film shown in FIG. 2.

In the invention, the liquid crystal cell for forming the liquid-crystal display device is optional. For example, the liquid crystal cell may be a suitable type liquid crystal cell such as an active matrix drive type liquid crystal cell represented by a thin-film transistor type liquid crystal cell or a passive matrix drive type liquid crystal cell represented by a twisted nematic or super-twisted nematic type liquid crystal cell. In FIGS. 3 and 4, the optical films 4 are stuck to both surfaces of a liquid crystal cell 5 through pressure-sensitive adhesive layers 6 to form a liquid-crystal display device 7.

When polarizers or optical members are provided on opposite surfaces of the liquid crystal cell, the polarizers or optical members may be identical to each other or may be different from each other. For formation of a liquid-crystal display device, one suitable component such as a prism array sheet, a lens array sheet, a light-diffusing plate, or a backlight unit may be further disposed in a suitable position or two or more suitable components may be further disposed in suitable positions.

The invention will be described below more specifically in connection with Examples and Comparative Examples.

EXAMPLE 1

A polarizer provided with an AG layer having a haze of 12.8%, a surface roughness Sm of 62.5 μm and an AG layer thickness of 8.5 μm and containing (11.0% by mass of) a silica-based filler and a UV-setting resin was stuck to a reflective polarizing film constituted by a combination of a cholesteric layer and a λ/4 plate, through a pressure-sensitive adhesive agent to thereby obtain an optical film having a haze of 14.3%.

EXAMPLE 2

A polarizer provided with an AG layer having a haze of 21.2%, a surface roughness Sm of 57.0 μm and an AG layer thickness of 13.5 μm and containing (12.0% by mass of) a silica-based filler and a UV-setting resin was stuck to reflective polarizing film constituted by a combination of a cholesteric layer and a λ/4 plate, through a pressure-sensitive adhesive agent to thereby obtain an optical film having a haze of 23.5%

EXAMPLE 3

A polarizer provided with an AG layer having a haze of 6.8%, a surface roughness Sm of 65.5 μm and an AG layer thickness of 5.5 μm and containing (5.0% by mass of) as silica-based filler and a UV-setting resin was stuck to a reflective polarizing film constituted by a combination of a cholesteric layer and a λ/4 plate, through a pressure-sensitive adhesive agent to thereby obtain an optical film having a haze of 9.3%.

COMPARATIVE EXAMPLE 1

A polarizer provided with an AG layer having a haze of 25.3%, a surface roughness Sm of 48.3 μm and an AG layer thickness of 4.2 μm and containing (11.0% by mass of) a silica-based filler and a UV-setting resin was stuck to a reflective polarizing film constituted by a combination of a cholesteric layer and a λ/4 plate, through a pressure-sensitive adhesive agent to thereby obtain an optical film having a haze of 5.6%.

COMPARATIVE EXAMPLE 2

A clear polarizer having no AG layer was stuck to a reflective polarizing film constituted by a combination of a cholesteric layer and a λ/4 plate, through a pressure-sensitive adhesive agent to thereby obtain an optical film having a haze of 2.4%.

COMPARATIVE EXAMPLE 3

A clear polarizer having no AG layer was stuck to a reflective polarizing film constituted by a combination of a cholesteric layer and a λ/4 plate, through a diffusing pressure-sensitive adhesive agent having a haze of 80% to thereby obtain an optical film having a haze of 81.2%.

The obtained optical films were evaluated as to performance thereof by the following method. Results of the evaluation were as shown in Table 1.

(Evaluation)
(1) Luminance Enhancement Rate

The luminance enhancement rate was calculated by the following formula:

Luminance Enhancement Rate $(\%) = (A/B) \times 100$ in which A is the luminance of a liquid-crystal display device in the case where the optical film obtained in each of Examples and Comparative Examples is provided on the backlight side surface of a liquid crystal panel while a polarizer is provided on the other surface of the liquid crystal panel, and B is the luminance of a liquid-crystal display device in the case where polarizers are provided on opposite surfaces of a liquid crystal panel.

(2) Effect on Backlight (B/L) Defect

The effect was evaluated on the basis of the following criterion.

"○": The defect caused by interference fringes or sticking could not be observed at the time of panel display.

"Δ": The detect caused by interference fringes or sticking could be observed at the time of panel display but there was no problem in practical use.

"×": The detect caused by interference fringes or sticking could be observed at the time of panel display and there was a problem in practical use.

(3) Comprehensive Judgment

"○": Both the luminance enhancement performance and the effect (2) were so high that there was a high merit in practical use.

"Δ": The luminance enhancement performance was low but the effect (2) was high.

"×": Both the luminance enhancement performance and the effect (2) were so low or the luminance enhancement performance was high but the effect (2) was so low that there was a problem in practical use.

| | AG polarizer Haze (%) | Optical film Haze (%) | Luminance enhancement rate (%) | Effect on B/L defect | Comprehensive judgment |
|---|---|---|---|---|---|
| Example 1 | 12.8 | 14.3 | 146 | ○ | ○ |
| Example 2 | 21.2 | 23.5 | 145 | ○ | ○ |
| Example 3 | 6.8 | 9.3 | 147 | Δ~○ | ○ |
| Comparative Example 1 | 25.3 | 5.6 | 147 | X~Δ | X |
| Comparative Example 2 | — | 2.4 | 147 | X | X |
| Comparative Example 3 | — | 81.2 | 141 | ○ | Δ |

It is obvious from Table 1 that both display quality and luminance enhancement can be achieved simultaneously by the optical film according to the invention (any one of Examples 1 to 3).

As described above, the optical film according to the invention is constituted by a laminate of a polarizer and a reflective polarizing film, the polarizer having an anti-glare layer, wherein the optical film has a haze in a range of from 5% to 30%. Hence, the optical film is excellent both in display quality of a liquid crystal panel and in the luminance enhancement effect. Moreover, when the optical film according to the invention is used, there is an advantage that the film thickness can be prevented from increasing because it is unnecessary to form a diffusing layer separately or insert a diffusing plate separately.

Moreover, with respect to display unevenness of the liquid crystal panel caused by thickness irregularity of the anti-glare layer surface, because the polarizer and the reflective polarizing film are integrated with each other through a pressure-sensitive adhesive agent, the anti-glare layer is formed so as to come in contact with (or inserted on) the pressure-sensitive adhesive agent so that the thickness irregularity of the anti-glare layer can be relaxed by the pressure-sensitive adhesive agent. Accordingly, the thickness irregularity of the anti-glare layer causes no problem in practical use.

Accordingly, even in the case where the anti-glare layer surface constituting the optical film has irregularity which cannot be allowed when the anti-glare layer is used as the outermost surface of the liquid crystal display, the anti-glare layer can be used sufficiently in the method using the anti-glare layer in the invention. Hence, because there arises a new merit that the anti-glare polarizer can be recycled, the industrial value of the invention is large.

This invention should not be limited to the embodiments described above. Various modifications can be included in this invention within a range which can be easily realized by those skilled in the art without departing from the spirit of the scope of claim.

What is claimed is:

1. An optical film comprising:

a polarizer; and a reflective polarizing film laminated with said polarizer, wherein said polarizer has an anti-glare layer formed directly on the polarizer, and said optical film has a haze (H) in a range of from 5% to 30% wherein a haze (H1) of said polarizer and a haze (H2) of said reflective polarizing film satisfy the relation H1>H2.

2. An optical film according to claim 1, wherein said polarizer and said reflective polarizing film are laminated through a pressure-sensitive adhesive agent.

3. An optical film according to claim 2, wherein a haze (H1) of said polarizer and the haze (H) of said optical film satisfy the relation H/H1>0.5.

4. An optical film according to claim 1, wherein said anti-glare layer formed in said polarizer has a thickness (d) in a range of from 3 μm to 20 μm, both inclusively.

5. An optical film according to claim 1, wherein said anti-glare layer formed in said polarizer has a surface roughness in a range of from 40 μm to 120 μm, both inclusively, in terms of an average peak-trough interval (Sm).

6. An optical film according to claim 1, wherein said reflective polarizing film is constituted by a combination of a cholesteric liquid crystal layer and a quarter-wave plate.

7. An optical film according to claim 1, wherein said reflective polarizing film has a linearly polarized light separating function using reflection from multilayer interfaces.

8. An optical film according to claim 1, wherein the polarizer is an absorption type polarizer, which transmits linearly polarized light.

9. A liquid-crystal display device comprising a liquid crystal cell, and at least one optical film and stuck to at least one surface of said liquid crystal cell through a pressure-sensitive adhesive layer, wherein said optical film comprises:

a polarizer; and a reflective polarizing film laminated with said polarizer, wherein said polarizer has an anti-glare layer formed directly on the polarizer, and said optical film has a haze (H) in a range of from 5% to 30% wherein a haze (H1) of said polarizer and a haze (H2) of said reflective polarizing film satisfy the relation H1>H2.

10. An optical film according to claim 9, wherein said polarizer and said reflective polarizing film are laminated through a pressure-sensitive adhesive agent.

11. An optical film according to claim 10, wherein a haze (H1) of said polarizer and the haze (H) of said optical film satisfy the relation H/H1>0.5.

12. An optical film according to claim 9, wherein said anti-glare layer formed in said polarizer has a thickness (d) in a range of from 3 $\mu$m to 20 $\mu$m, both inclusively.

13. An optical film according to claim 9, wherein said anti-glare layer formed in said polarizer has a surface roughness in a range of from 40 $\mu$m to 120 $\mu$m, both inclusively, in terms of an average peak-trough interval (Sm).

14. An optical film according to claim 9, wherein said reflective polarizing film is constituted by a combination of a cholesteric liquid crystal layer and a quarter-wave plate.

15. An optical film according to claim 9, wherein said reflective polarizing film has a linearly polarized light separating function using reflection from multilayer interfaces.

* * * * *